US011483577B2

(12) United States Patent
Gonsalves

(10) Patent No.: US 11,483,577 B2
(45) Date of Patent: Oct. 25, 2022

(54) PROCESSING OF CHROMA-SUBSAMPLED VIDEO USING CONVOLUTIONAL NEURAL NETWORKS

(71) Applicant: Avid Technology, Inc., Burlington, MA (US)

(72) Inventor: Robert Gonsalves, Wellesley, MA (US)

(73) Assignee: Avid Technology, Inc., Burlington, MA (US)

(*) Notice: Subject to any disclaimer, the term of this patent is extended or adjusted under 35 U.S.C. 154(b) by 107 days.

(21) Appl. No.: 17/205,618

(22) Filed: Mar. 18, 2021

(65) Prior Publication Data

US 2022/0303557 A1    Sep. 22, 2022

(51) Int. Cl.
*H04B 1/66* (2006.01)
*H04N 19/186* (2014.01)
(Continued)

(52) U.S. Cl.
CPC ......... *H04N 19/186* (2014.11); *G06K 9/6256* (2013.01); *G06N 3/0445* (2013.01);
(Continued)

(58) Field of Classification Search
CPC ... G09G 2340/0435; G09G 2320/0247; G09G 2360/144; G09G 2370/04; G09G 2370/12;
(Continued)

(56) References Cited

U.S. PATENT DOCUMENTS 10,685,282 B2    6/2020 Rippel et al.
2019/0208161 A1*    7/2019 Wan .................. H04N 7/015
(Continued)

OTHER PUBLICATIONS

JJ. A. F. Thompson, M. Schonwiesner, Y. Bengio, and D. Willett, "How Transferable Are Features in Convolutional Neural Network Acoustic Models across Languages?," ICASSP 2019—2019 IEEE International Conference on Acoustics, Speech and Signal Processing (ICASSP), Brighton, United Kingdom, May 2019, pp. 2827-2831.
L. Gatys, A. Ecker, and M. Bethge, "A Neural Algorithm of Artistic Style," Journal of Vision, vol. 16, No. 12, p. 326, Sep. 2016.
O. Rippel, S. Nair, C. Lew, S. Branson, A. Anderson, and L. Bourdev, "Learned Video Compression," 2019 IEEE/CVF International Conference on Computer Vision (ICCV), Seoul, Korea, 2019, pp. 3453-3462.
(Continued)

*Primary Examiner* — Masum Billah
(74) *Attorney, Agent, or Firm* — Oliver Strimpel

(57) ABSTRACT

Efficient processing of chroma-subsampled video is performed using convolutional neural networks (CNNs) in which the luma and chroma channels are processed separately. The luma channel is independently convolved and downsampled and, in parallel, the chroma channels are convolved and then merged with the downsampled luma to generate encoded chroma-subsampled video. Further processing of the encoded video that involves deconvolution and upsampling, splitting into two sets of channels, and further deconvolutions and upsampling is used in CNNs to generate decoded chroma-subsampled video in compression-decompression applications, to remove noise from chroma-subsampled video, or to upsample chroma-subsampled video to RGB 444 video. CNNs with separate luma and chroma processing in which the further processing includes additional convolutions and downsampling may be used for object recognition and semantic search in chroma-subsampled video.

20 Claims, 10 Drawing Sheets

(51) Int. Cl.
*H04N 19/85* (2014.01)
*G06T 5/00* (2006.01)
*G06K 9/62* (2022.01)
*H04N 19/46* (2014.01)
*G06N 3/04* (2006.01)
*G06N 3/08* (2006.01)
*H04N 9/77* (2006.01)
*G06V 20/40* (2022.01)

(52) U.S. Cl.
CPC ............... *G06N 3/08* (2013.01); *G06T 5/002* (2013.01); *G06V 20/40* (2022.01); *H04N 9/77* (2013.01); *H04N 19/46* (2014.11); *H04N 19/85* (2014.11); *G06T 2207/10016* (2013.01); *G06T 2207/10024* (2013.01); *G06T 2207/20081* (2013.01); *G06T 2207/20084* (2013.01)

(58) Field of Classification Search
CPC .. G09G 2370/18; G09G 3/2096; G09G 5/006; G09G 5/18
USPC .......................................................... 375/240
See application file for complete search history.

(56) References Cited

U.S. PATENT DOCUMENTS

2020/0036995 A1* 1/2020 Rippel ................. G06V 10/774
2021/0104074 A1* 4/2021 Joshi ......................... G06T 3/40

OTHER PUBLICATIONS

F. Mentzer, G. D Toderici, M. Tschannen, and E. Agustsson, "High-Fidelity Generative Image Compression," Advances in Neural Information Processing Systems, pp. 11913-11924, Curran Associates, Inc., 2020.

Dumoulin, Vincent, and Francesco Visin, "A Guide to Convolution Arithmetic for Deep Learning." ArXiv:1603.07285 [Cs, Stat], Jan. 2018. arXiv.org, http://arxiv.org/abs/1603.07285.

Zuhe Li, Yangyu Fan and Fengqin Wang, Convolutional Autoencoder-based Color Image Classification using Chroma Subsampling in YCbCr Space, 2015 8th International Congress on Image and Signal Processing (CISP 2015).

Yosinski, Jason et al. "How Transferable Are Features in Deep Neural Networks?" ArXiv:1411.1792 [Cs], Nov. 2014. arXiv.org, http://arxiv.org/abs/1411.1792.

* cited by examiner

PROCESSING OF CHROMA-SUBSAMPLED VIDEO USING CONVOLUTIONAL NEURAL NETWORKS

BACKGROUND

As image raster sizes, frame rates, and dynamic range increase, the amount of data in a video stream becomes ever greater. This in turn leads to an ever-more pressing need for efficient video compression so that video can be transmitted over available data connections. Artificial intelligence (AI) has been deployed to create the encoders and decoders that perform video compression and decompression respectively in an efficient manner. While certain AI-based methods have been used to process video represented as RGB images, such efficient processing has not been used for other video formats. There is a need to apply AI-based methods to other video formats that are commonly used.

SUMMARY

Chroma-subsampled video is efficiently processed using convolutional neural networks (CNNs) in which the luma channels and chrominance (chroma) channels undergo separate convolutions and downsampling and upsampling. This obviates the need for conversion to and from RGB 444 video, which reduces computational requirements and produces more accurate results.

In general, in one aspect, a method of generating encoded chroma-subsampled video comprises: receiving the chroma-subsampled video; and using an encoding convolutional neural network (CNN) to: convolve and downsample a luma channel of the chroma-subsampled video; perform at least one of a convolution and downsampling of chroma channels of the chroma-subsampled video; merge the convolved and downsampled luma and chroma channels; and generate the encoded chroma-subsampled video by convolving and downsampling the merged luma and chroma channels.

Various embodiments include one or more of the following features. The encoding of the chroma-subsampled video generates a compressed version of the chroma-subsampled video. The encoding convolutional neural network was trained using a training dataset comprising original chroma-subsampled video as input and comparing the original chroma-subsampled video as expected output with chroma-subsampled video generated by using the encoding CNN to encode the original chroma-subsampled video and a corresponding decoding CNN to decode the encoded chroma-subsampled video. The training includes determining matrix values of kernels used by the encoding and decoding CNNs. Using a decoding CNN to generate video represented in RGB 444 color space from the encoded chroma-subsampled video. The encoding CNN and the decoding CNN are trained using an input data set comprising chroma-subsampled video generated by subsampling original video represented in RGB 444 color space and comparing the original video represented in RGB 444 color space with video represented in RGB 444 color space generated by encoding the original video represented in RGB 444 color space using the encoding CNN and decoding the encoded original video represented in RGB 444 color space using the decoding CNN. The received chroma-subsampled video is noisy, and further comprising using a decoding CNN to generate denoised chroma-subsampled video from the received noisy video. The encoding CNN and the decoding CNN were trained using an input data set comprising noisy chroma-subsampled video generated by adding noise to an original chroma-subsampled video and comparing the original chroma-subsampled video with denoised chroma-subsampled video generated by sequentially encoding the noisy chroma-subsampled video using the encoding CNN and decoding the encoded chroma-subsampled video using the decoding CNN. The encoding CNN further includes steps that convolve and downsample the encoded chroma-subsampled video to generate an identifier of an object depicted in the received chroma-subsampled video. The encoding CNN is trained using a training dataset comprising: chroma-subsampled video; and associated with each frame of the chroma-subsampled video a known identifier of an object depicted in the frame; and wherein for each frame of the training data set provided as input to the encoding CNN, an output of the encoding CNN is compared with its associated object identifier, and a difference between the identifier output by the CNN and the known identifier is fed back into the encoding CNN. The encoding CNN further includes steps that convolve and downsample the encoded chroma-subsampled video to generate an image embedding for each frame of the received chroma-subsampled video, wherein the embedding of a given frame corresponds to a caption for an object depicted in the given frame. The encoding CNN is trained using a training dataset comprising: chroma-subsampled video; and associated with each frame of the chroma-subsampled video a caption for an object depicted in the frame; and wherein for each frame of the training data set provided as input to the encoding CNN: an image embedding is generated from the frame by the encoding CNN; and a text embedding is generated from a caption associated with the frame by a text-encoding CNN; and a difference between the image embedding and the text embedding is fed back into the encoding CNN and the text CNN.

In general, in another aspect, a method of decoding encoded chroma-subsampled video comprises: receiving the encoded chroma-subsampled video; and using a decoding convolutional neural network (CNN) to: split convolved and downsampled merged luma and chroma channels of the encoded chroma-subsampled video into a first set of channels and a second set of channels; deconvolve and upsample the first set of channels; process the second set of channels by performing at least one of a deconvolution and upsampling; output the deconvolved and upsampled first set of channels as a luma channel of decoded chroma-subsampled video; and output the processed second set of channels as chroma channels of the decoded chroma-subsampled video.

Various embodiments include one or more of the following features. The encoded chroma-subsampled video comprises chroma-subsampled video that has been compressed by an encoding CNN. The encoding and decoding CNNs were trained using a training dataset comprising original chroma-subsampled video as input and comparing the original chroma-subsampled video as expected output with chroma-subsampled video generated by sequentially using the encoding CNN to encode the original chroma-subsampled video and the decoding CNN to decode the encoded chroma-subsampled video. The training includes determining matrix values of kernels used by the encoding and decoding CNNs.

In general, in another aspect, a computer program product comprises: a non-transitory computer-readable medium with computer-readable instructions encoded thereon, wherein the computer-readable instructions, when processed by a processing device instruct the processing device to perform a method of generating encoded chroma-subsampled video comprising: receiving the chroma-subsampled video; and using an encoding convolutional neural network (CNN) to:

convolve and downsample a luma channel of the chroma-subsampled video; convolve and downsample chroma channels of the chroma-subsampled video; merge the convolved and downsampled luma and chroma channels; and generate the encoded chroma-subsampled video by convolving and downsampling the merged luma and chroma channels.

In general, in another aspect, a computer program product comprises: a non-transitory computer-readable medium with computer-readable instructions encoded thereon, wherein the computer-readable instructions, when processed by a processing device instruct the processing device to perform a method of decoding encoded chroma-sub sampled video comprising: receiving the encoded chroma-subsampled video; and using a decoding convolutional neural network (CNN) to: split convolved and downsampled merged luma and chroma channels of the encoded chroma-sub sampled video into a first set of channels and a second set of channels; convolve and upsample the first set of channels; process the second set of channels to perform at least one of a deconvolution and upsampling the second set of channels; output the convolved and upsampled first set of channels as a luma channel of decoded chroma-subsampled video; and output the processed second set of channels as chroma channels of the decoded chroma-subsampled video.

In general, in another aspect, a computer program product comprises a system comprising: a memory for storing computer-readable instructions; and a processor connected to the memory, wherein the processor, when executing the computer-readable instructions, causes the system to perform a method decoding encoded chroma-subsampled video comprising: receiving the encoded chroma-subsampled video; and using a decoding convolutional neural network (CNN) to: split convolved and downsampled merged luma and chroma channels of the encoded chroma-sub sampled video into a first set of channels and a second set of channels; convolve and upsample the first set of channels; convolve and upsample the second set of channels; output the convolved and upsampled first set of channels as a luma channel of decoded chroma-subsampled video; and output the convolved and upsampled second set of channels as chroma channels of the decoded chroma-sub sampled video.

In general, in another aspect, a system comprises a memory for storing computer-readable instructions; and a processor connected to the memory, wherein the processor, when executing the computer-readable instructions, causes the system to perform a method of decoding encoded chroma-subsampled video comprising: receiving the encoded chroma-subsampled video; and using a decoding convolutional neural network (CNN) to: split convolved and downsampled merged luma and chroma channels of the encoded chroma-subsampled video into a first set of channels and a second set of channels; deconvolve and upsample the first set of channels; process the second set of channels by performing at least one of a deconvolution and upsampling; output the deconvolved and upsampled first set of channels as a luma channel of decoded chroma-sub sampled video; and output the processed second set of channels as chroma channels of the decoded chroma-subsampled video.

DETAILED DESCRIPTION

Many common video formats rely on the observation that the human eye is more sensitive to changes in brightness than to changes in color. Thus, if the data that makes up a digital image is divided into its luma component, which is effectively a black-and-white image, and its chroma components, the perceived quality of an image can be retained even if the quality of the chroma components are reduced while retaining the original quality of the luma. This is the basis of the video formats with subsampled chroma. Current AI-based image processing is generally based on the use of video that uses the RGB color space in which separate full-resolution channels represent each of the red, green, and blue components of image pixels. When video formats using downsampled chroma are processed with current AI-based systems, the video is first converted to RGB 444, which is compressed and decompressed, and the resulting RGB 444 video is converted back into the downsampled chroma format.

Figure 1:
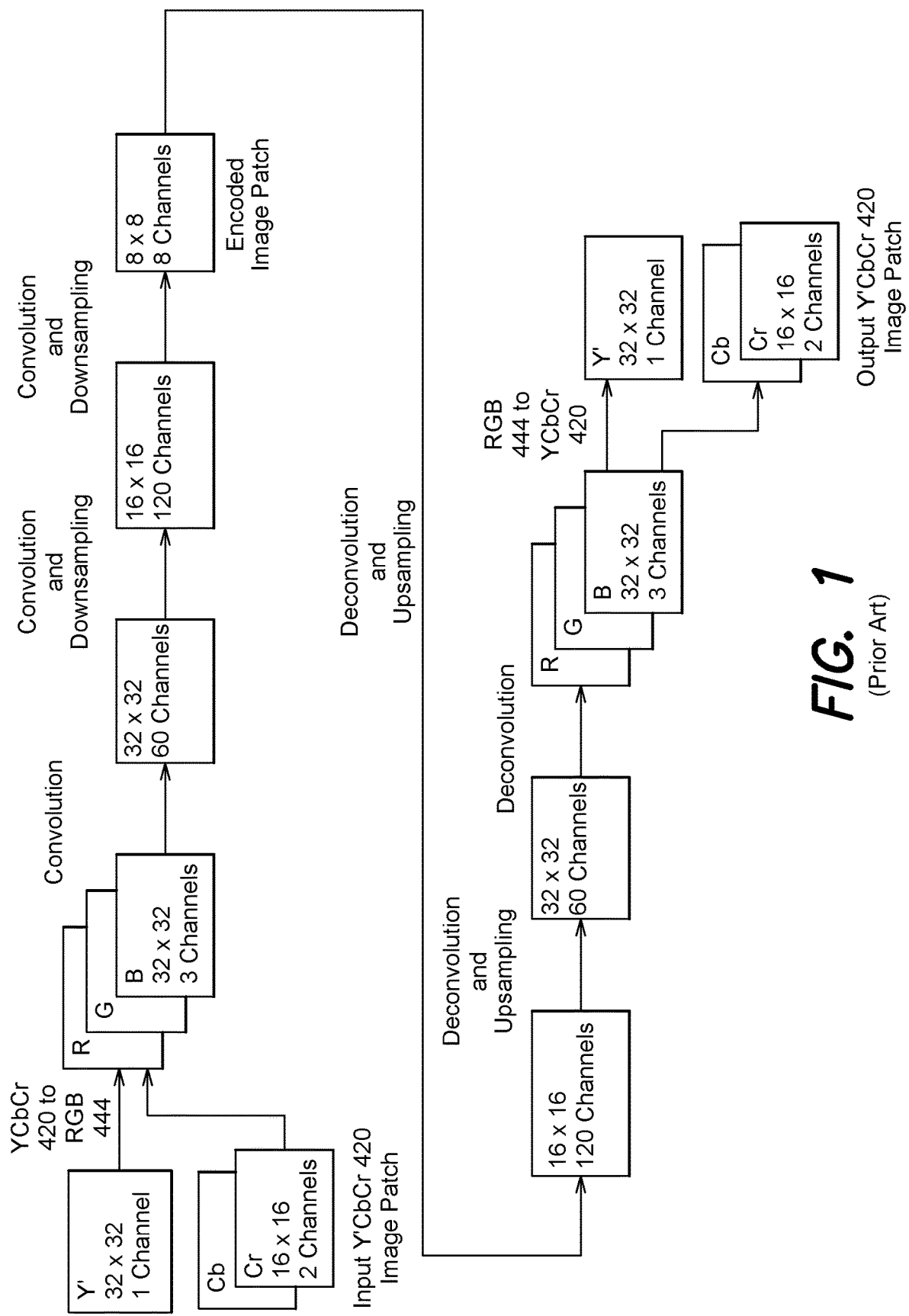
FIG. 1 is a high-level block diagram of a prior art autoencoder CNN in which chroma-subsampled video is first converted to RGB 444 before compression and decompression.

The color space in which chroma-subsampled video is commonly represented is referred to as Y'CbCr in which Y' is the luma (or luma) component, and Cb and Cr are the blue-difference and red-difference chroma (or chroma) components. The subsampling involves assigning fewer bits to encode the chroma components than to encode the luma component. This process is illustrated in FIG. 1, which shows the compression and decompression of Y'CbCr 422 video, in which the luma component comprises 4 parts of data, and each of the chroma components is assigned 2 parts. As shown in the figure, the Y'CbCr 422 is initially converted into RGB 444 video. The RGB is then compressed and decompressed, and the resulting RGB 444 is converted into Y'CbCr 422 in the final step.

We describe methods of processing video with subsampled chroma that eliminate the intermediate conversion into RGB 444, thus obviating the need for two conversion steps and reducing the computational requirements for processing subsampled video. Furthermore, fewer operands are involved in the process, which leads to additional computational efficiency and quality of the results. Examples of such video are Y'CbCr 422 and Y'CbCr 420. In Y'CbCr 422, the luma (Y') is encoded with 8 bits per pixel, and the blue and red color difference components Cb and Cr are also encoded with 8 bits per pixel each, but with only half the horizontal resolution of the luma. In Y'CbCr 420, each of the Cb and Cr components are encoded at half the horizontal resolution of the luma and only sampled on each alternate row. With both the horizontal and vertical resolution halved, each of the chroma channels contains only a quarter of the data contained within the luma channel.

Figure 2:
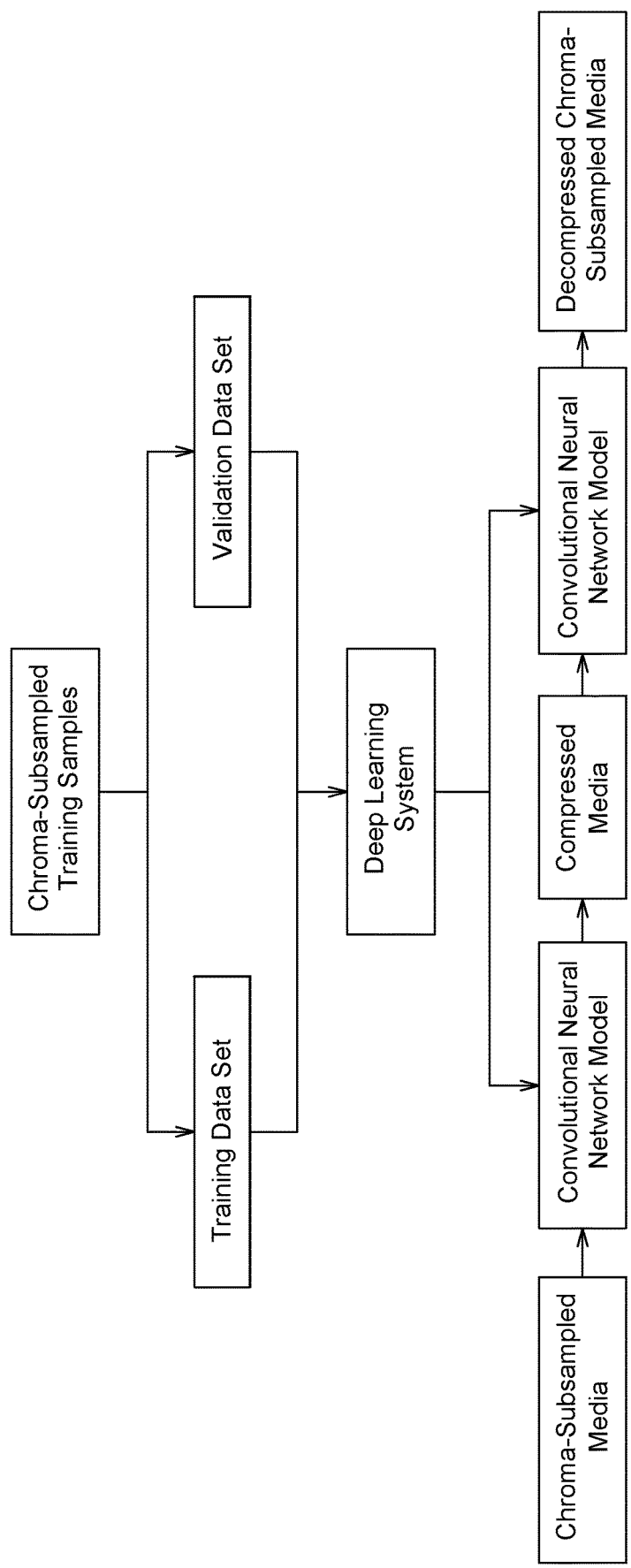
FIG. 2 is a high-level block diagram illustrating the training and inference phases of the described CNN-based autoencoder for chroma-subsampled media.

FIG. 2 is a high-level flow diagram showing the phases involved in the described AI-based method for direct compression and decompression of chroma-subsampled media. The methods adopt commonly-accepted implementation practices for training and utilizing a neural network involving the use of activation functions, normalization, learning rate adjustment, batch size, and so on. The methods deploy CNNs which include steps involving convolutions, strided convolutions that perform both convolutions and downsampling, deconvolutions, also referred to as transposed convolutions, and strided deconvolutions that perform both deconvolution and upsampling. Convolutional networks for deep learning are described in Dumoulin, V., & Visin, F. (2016), "A guide to convolution arithmetic for deep learning," arXiv 1603.07285, which is wholly incorporated herein by reference.

Figure 3:
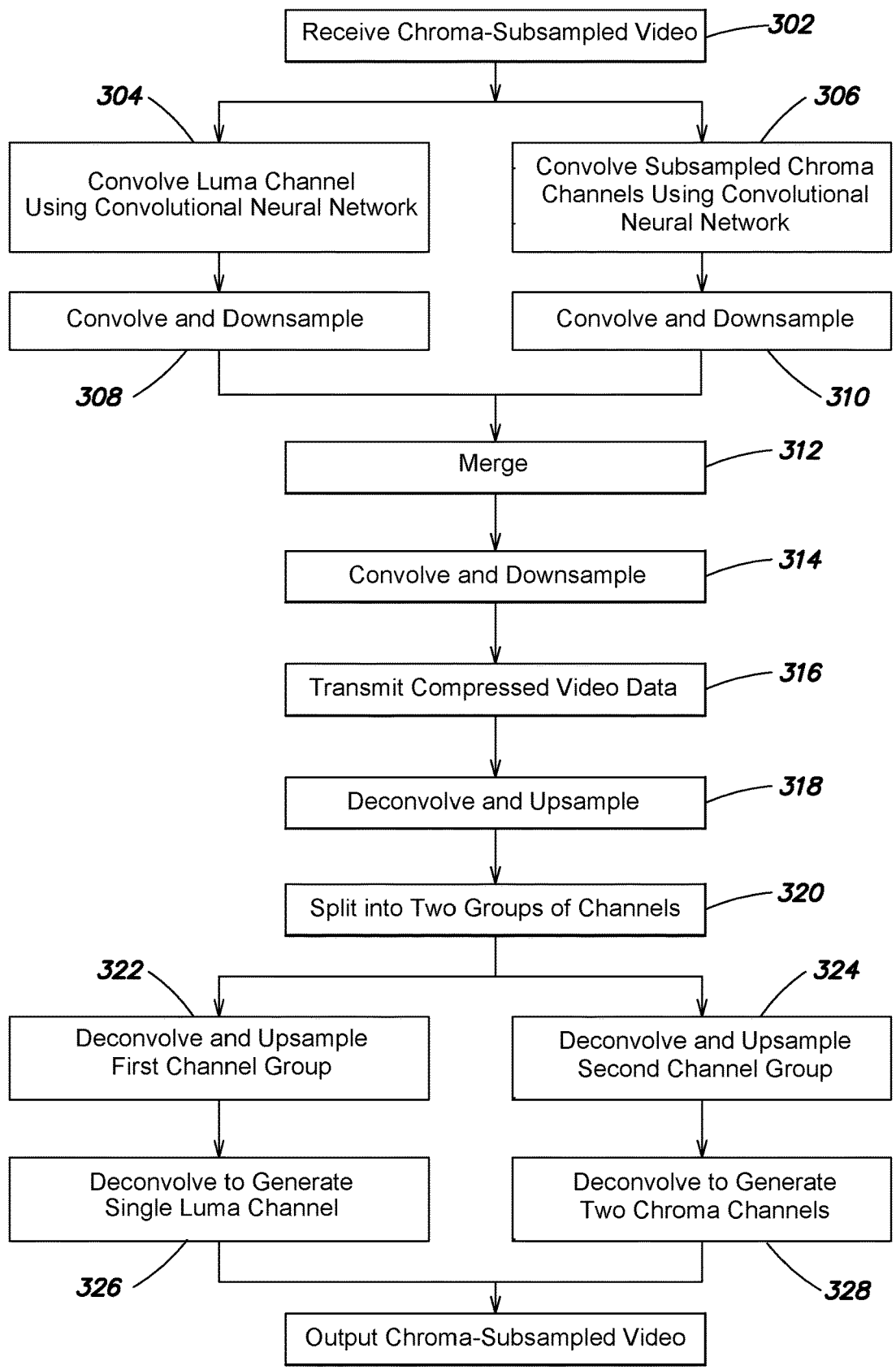
FIG. 3 is a high-level flow diagram showing the steps involved in the encoding and decoding of chroma-subsampled video.
Figure 4:
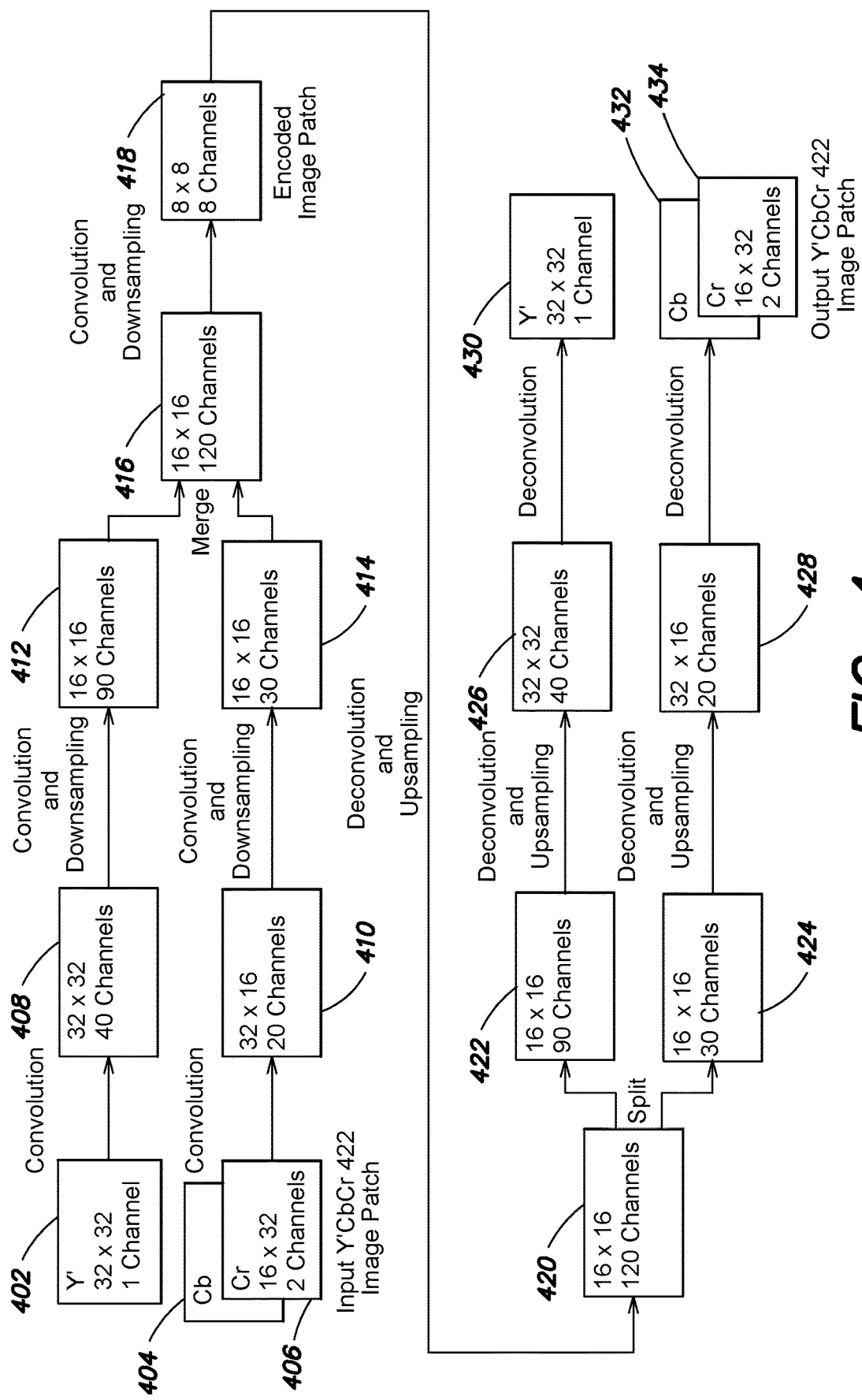
FIG. 4 is a CNN model of an autoencoder for video represented in a Y'CbCr 422 color space.

An AI-based method for direct compression and decompression is illustrated in the flow diagram of FIG. 3 and an exemplary application of the method for imagery encoded in the Y'CbCr 422 color space is shown in the high-level block diagram of FIG. 4. The left hand side of FIG. 4 illustrates an encoder CNN and the right hand side illustrates a decoder CNN. The method starts with the training phase in which the optimal values of the various trainable parameters of the CNN are determined. In this phase, the training data consists of a set of images or image patches represented in the Y'CbCr 422 color space. The training dataset is divided into two parts, with about 70% of the samples used for training and the remainder for validation, i.e., to test the model on data that was not used in the training. The quality of the model's performance is measured by the loss of information between an input test image and the image that is output following compression and decompression. As training proceeds, the loss diminishes until it reaches an asymptotic level. In general, the asymptotic level of loss reached with the validation dataset does not drop to the asymptotic level of loss achieved with the training data. In one training example, the dataset comprises about 80,000 image patches of which 55,000 are used for training and 25,000 for validation. The parameters in the model are determined using the Adam optimization method, which is a variant of stochastic gradient descent. After 100 epochs of training, the training loss is about $7.10^{-5}$ and the validation loss is about $1.10^{-4}$.

The number of trainable parameters depends on the size of the images or, if they are broken down, the size of the image patches used in the training as well as on the choice of kernel size and numbers, and the degree of compression required. The values of these hyperparameters are determined by performing initial sweeps over various combinations of the hyperparameter values and selecting those that appear to achieve results in an optimal range. Ablation studies are run to gain a better understanding of the performance of the autoencoder model by selectively removing certain components in order to determine the extent to which they contribute to the overall performance of the system. Therefore, the final number of parameters that are then used in the inference phase, i.e., when the trained model is put to work, also depends on the results of an ablation step in which the number of parameters may be pruned by eliminating those that are found not to contribute significantly to the quality of the results. The example shown in FIG. 4 is used to illustrate how the number of trainable parameters is determined. For a Y'CbCr 422 image patch of 32×32 pixels the 32×32 luma values 402 are convolved by 40 different 7×7 kernels into 40 32×32 channels 408. Since each matrix element of each kernel is trainable, this results in 7×7×40 trainable parameters. In additional, overall weights for each of the kernels are determined in the training process, resulting in an additional 40 parameters. Two chroma channels 404, 406 of 16×32 values each are convolved by 20 7×7×2 kernels into 20 32×16 channels, which results in an additional 7×7×2×20 trainable parameters corresponding to each matrix element of each of the kernels, as well as overall weights of each of the 20 kernels. For the next step 90 3×3×40 kernels convolve and downsample the luma-derived channels to 90 16×16 channels 412, resulting in a further 90×3×3×40 trainable parameters plus 90 overall kernel weights. Similarly, 30 3×3×20 kernels convolve and downsample the luma-derived channels, resulting in 30×3×3×20 trainable parameters plus 30 overall kernel weights. Following the merging of the luma-derived and chroma-derived data into 120 16×16 channels, the data is convolved and downsampled to 8 8×8 channels 418 using 8 16×16 kernels resulting in 8×16×16 trainable parameters plus 8 overall weights. For the decompression phases, the number of trainable parameters can be determined in a similar fashion, the first deconvolution and upsampling step requiring 120× 3×3×8 to generate 120 16×16 channels 420. Following the splitting of the 120 channels into 90 16×16 channels 422 and 30 16×16 channels 424, the upsampling deconvolutions of these two sets of channels involve 40×3×3×90 +40 parameters to generate 40 channels 426 and 20×3×3×30 +20 parameters to generate 20 channels 428, and 7×7×40 parameters to generate output luma channel 430 and 2×7×7×20 +2 parameters to generate output chroma channels 432 and 434.

Once the training phase has been completed, Y'CbCr 422 imagery may be compressed and decompressed in the inference mode. This is described with reference to the flow diagram of FIG. 3 and the example shown in FIG. 4. In step 302, the chroma-subsampled video is received. The process operates on a frame-by-frame basis, and optionally on patches of each frame so as to break up the computation into more manageable pieces. In the illustrated example, the process operates on successive 32×32 pixel patches of a frame of chroma-subsampled video. The patches consist of luma channel 402, which contains an array of 32×32 pixel values encoded at 4-bits per pixel, and chroma channels Cb 404 and Cr 406, the latter each consisting of an array of 16×32 pixel values encoded at 2-bits per pixel. In the first step, separate convolutions are performed on luma channel 402 (step 304) and on chroma channels 404, 406 (step 306). In the illustrated example, the luma convolution generates 40 32×32 channels 408, each channel being generated by convolving the 32×32 pixel value with a different one of 40 kernels. A suitable kernel size is 7×7, with each kernel element having a value that mostly lies between −1 and +1 after completion of the training. The resulting values are normalized, and also passed through a non-linear activation function. The chroma convolution involves convolving the 16×32 pixel array of chroma values with each of 20 different kernels, generating 20 32×16 channels 410, with a suitable kernel size for the chroma convolution being 7×7×2. As with the luma, the resulting values are normalized and passed through an activation function. Next, the luma channels and the chroma channels (for 422 video only) are further convolved and downsampled (steps 308, 310). In the example shown, the 40 channels of 32×32 convolved luma values resulting from the last step are convolved with each of 90 different kernels, each kernel having a size of 3×3×40 using a stride of 2×2, resulting in 90 channels of 16×16 values (412). For chroma, the 20 channels of 16×32 convolved chroma values are convolved with each of 30 different kernels with a stride of 1×2 to generate 30 channels of 16×16 values (414). The 90 channels derived from the luma values (412) and the 30 channels derived from the chroma values (414) are merged by concatenating them (step 312) to produce 120 channels of 16×16 values (416). In the final compression step, the 16×16 120 channels are convolved and downsampled (step 314). In the illustrated example, this is performed using 8 different kernels, each of dimension 3×3×120 with a stride of 2×2 to generate encoded image patch 418 comprising 8 channels of 8×8 values. This compressed patch may be transmitted over a data connection (step 316) and may then be decompressed at the receiving site.

The decoding process reverses the various compression steps described above and proceeds as follows. A deconvolution and upsampling is applied to the compressed image patch (step 318). In the example illustrated in FIG. 3, this is achieved by using 120 8×8×8 kernels and using a 2×2 upsampling stride to generate 120 16×16 channels (420). Next the channels are split into two groups to represent the luma and chroma channels, respectively (320). The number of channels assigned to each of the luma and chroma channels corresponds to the respective number of channels for luma and chroma prior to merge step 312 during the compression phase as shown in FIGS. 4 at 412 and 414. In the example shown in FIG. 4, there are 90 channels for luma (422) and 30 channels for luma (424). Each group of channels (422 video only) is next subject to a deconvolution and upsampling (steps 322 and 324). In the illustrated example, for the luma channels 40 16×16×90 kernels are used with a 2×2 upsampling ratio to generate 40 32×32 channels (426), and for the chroma channels, 20 16×16×30 kernels are used with a 2×1 upsampling ratio to generate 20 32×16 channels (428). In the final steps, a second deconvolution is applied to the channels generated from the previous operations on the luma and the chroma channels to generate a single output luma channel having vertical and horizontal dimensions equal to that of the input image patch (step 326) and two chroma channels, each with half the number of elements as the image patch (step 328). In the illustrated example, this is achieved by applying a deconvolution to the 40 32×32 channels (426) with a single 32×32×40 kernel to generate a 32×32 output luma channel (430). Similarly, a deconvolution is applied to the 20 32×16 channels (428) with two kernels to generate two 16×32 output chroma channels 432 and 434.

To summarize, once the parameters defining the kernels to be deployed in each of the various steps, which includes their matrix element values and their overall weights are obtained from the training process, the compression proceeds with steps 304-314 (FIG. 3) and the decompression includes steps 318-328. None of the steps involve the conversion of the subsampled chroma video into RGB 444 color space since all the convolution and subsampling steps take place separately on the luma and on the chroma channels.

Figure 5:
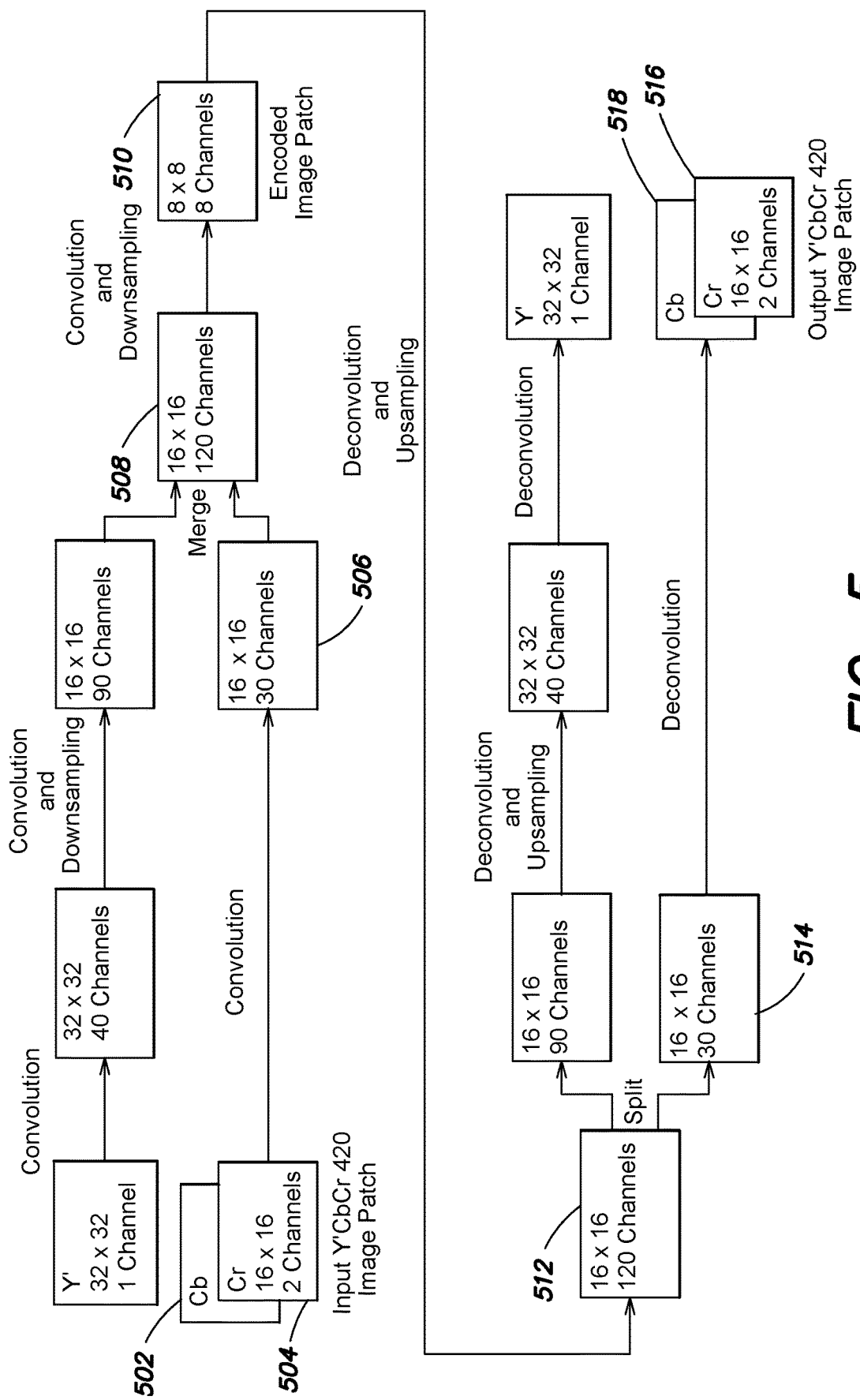
FIG. 5 is a CNN model of an autoencoder for video represented in a Y'CbCr 420 color space.

An analogous training and inference process may be deployed to compress and decompress Y'CbCr 420. While each of the convolution, downsampling, deconvolution, and upsampling steps are analogous to those for Y'CbCr 422, the numbers and dimensions of some of the kernels are different, as illustrated in the example shown in FIG. 5. Thus, while the compression of the luma data is unchanged from the 422 case, the chroma data of the input image patch comprises two channels, each with a quarter of the number of elements as the luma channel. Referring to FIG. 5, input image patch chroma channels 502 and 504 each have dimension 16×16 as compared to the 32×32 dimension of the luma channel. The first convolution step applies 30 kernels of dimension 16×16×2 to generate 30 16×16 channels (506). These are merged with the 90 channels derived from the luma component to result in 120 16×16 channels (508). The subsequent compression step proceeds as with the 422 case discussed above with convolution and downsampling to 8 8×8 channels representing the encoded image patch (510). The decompression starts with deconvolution and upsampling to 120 16×16 channels (512) using 120 8×8×8 kernels. The 120 channels are then split into a group of 90 for luma and 30 for chroma (514). In the final step in the chroma pathway, the 30 16×16 channels are subject to a deconvolution using 2 16×16×30 kernels to generate output 16×16 chroma channels 516 and 518.

Autoencoders that use the described CNN-based methods are able to achieve a 4:1 compression ratio for Y'CbCr 422 video and a 3:1 compression ratio for Y'CbCr 420 video. The described methods also avoid the extra compute time and memory resources required to convert to and from RGB 444 in the prior methods. In addition, the quality of the output video in the prior methods is inferior to that of the described methods with native processing in 420 or 422 because the CNN solves a somewhat different problem, i.e., that of recreating the synthetic RGB 444 pixels, not knowing that half or three quarters of the chroma information is effectively discarded.

The CNN-based methods described herein may also be used to improve the reconstruction of missing chroma data from chroma-sub sampled 422 or 420 video sources. Current methods use nearest neighbor or simple interpolation methods to reconstruct chroma values when converting chroma-subsampled video to RGB 444. In this application, the CNN model is trained using a dataset of chroma-subsampled video that was generated by subsampling RGB 444 video. The model output is then trained against the original RGB 444 as the expected output. In effect, this enables the CNN to capture information about the characteristics of actual video data that is missing from the algorithmic upsampling methods used hitherto.

Figure 6:
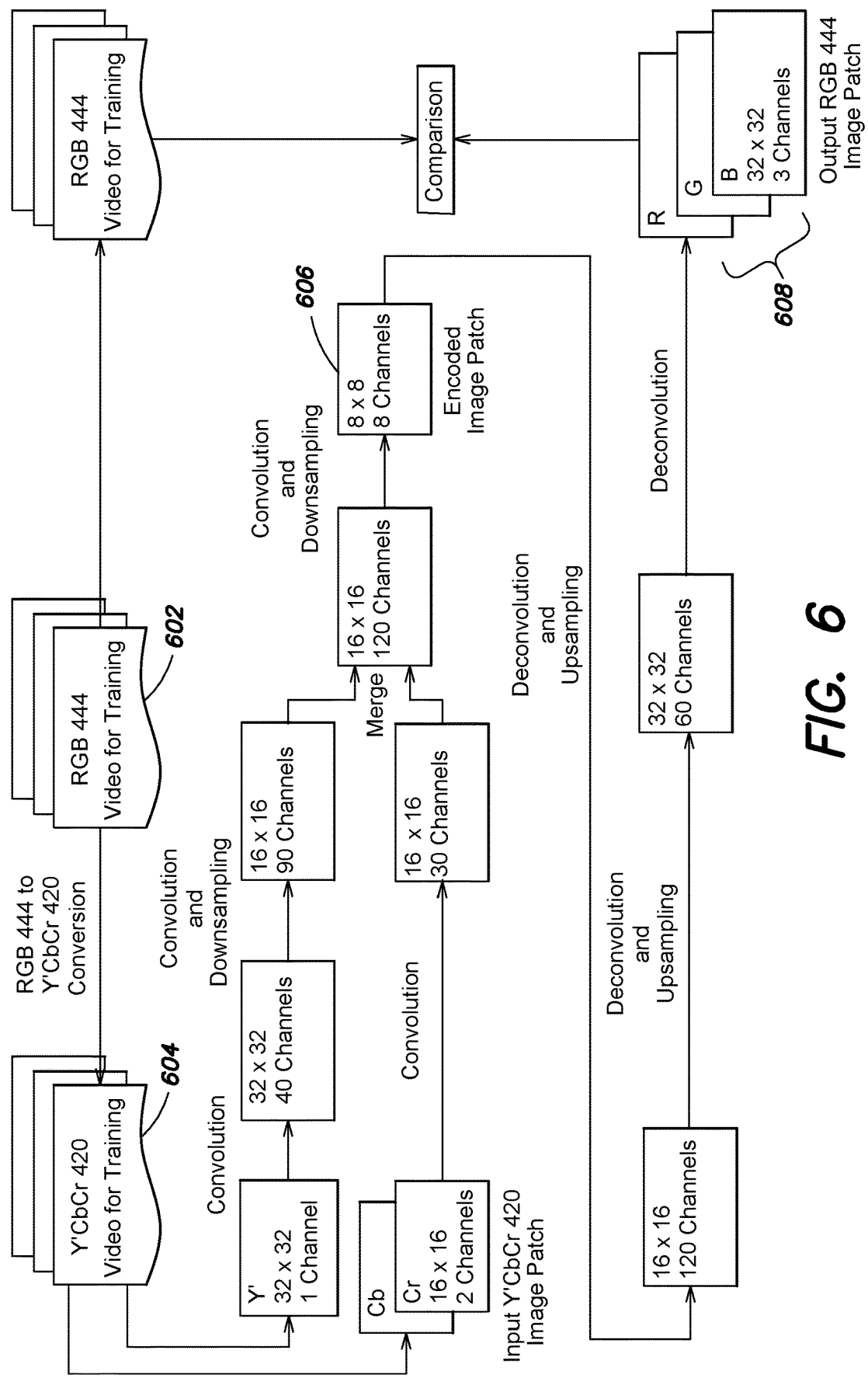
FIG. 6 is a CNN model for converting Y'CbCr video into RGB 444 video.

An example of a CNN model for converting Y'CbCr 420 into RGB 444 is shown in FIG. 6. The model is trained using training dataset of RGB 444 video 602, which is converted to Y'CbCr video 604 and provided as input to the model. The model output is trained by comparing it to the original RGB 444 data. The first part of the CNN proceeds as for the encoder portion of the autoencoder CNN model shown in FIG. 5, in which the luma and chroma components are processed separately with the luma channels being convolved, downsampled, and then merged with the convolved chroma channels. The merged channels are downsampled into encoded image patch 606. In these steps, the data undergoes dimensionality reduction, which transforms data from a high-dimensional space into a low-dimensional space that retains meaningful properties of the original data. These properties include information as to the characteristics of the original video data that enables the conversion to be improved as compared to the algorithmic methods. To generate the RGB 444 output, the encoded image patch is convolved and upsampled and finally convolved and split into the R, G, and B channels of output RGB 444 image patch 608.

Other applications of computational neural networks to chroma-subsampled video include denoising, object recognition, and semantic search.

Figure 7:
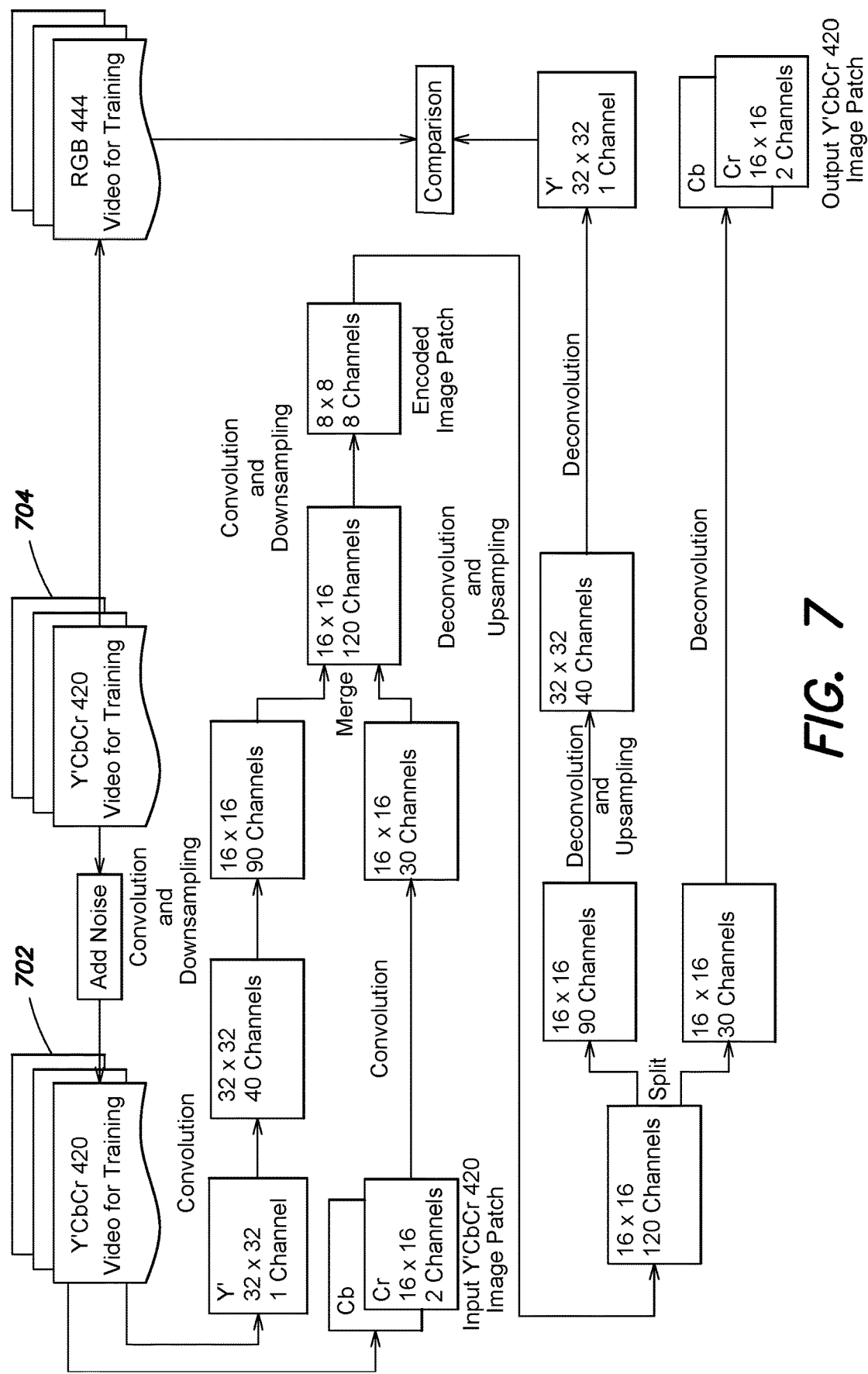
FIG. 7 is a CNN model for removing noise from Y'CbCr video.

For a CNN deployed to remove noise from chroma sub-sampled video, noisy Y'CbCr video is provided as input, and, following processing by the CNN, denoised video is output. The denoising is performed with greater efficiency when the video is processed in its original Y'CbCr color space without conversion to RGB 444. A CNN model for denoising chroma-subsampled video is shown in FIG. 7. The CNN model is the same as the autoencoder CNN model, with the initial steps convolving and downsampling the input YCbCr video separately and then merging and downsampling the result to generate an encoded image patch. These steps effect a dimensionality reduction, which has the effect of forcing the system to eliminate all but the essence of the input data. The information, or signal, contained in this low-dimension single channel is retained in the subsequent steps corresponding to the decoder phase of the autoencoder, in which this information-bearing signal is mostly retained while the noise is discarded. The CNN for denoising is trained using an input data set of noisy Y'CbCr 702 generated by artificially adding noise to clean Y'CbCr video 704. The noise-generating processes used to corrupt the video may add various types of noise, such as additive isotropic Gaussian noise, marking noise, or salt-and-pepper noise. The CNN output is trained against the original clean Y'CbCr.

Figure 8:
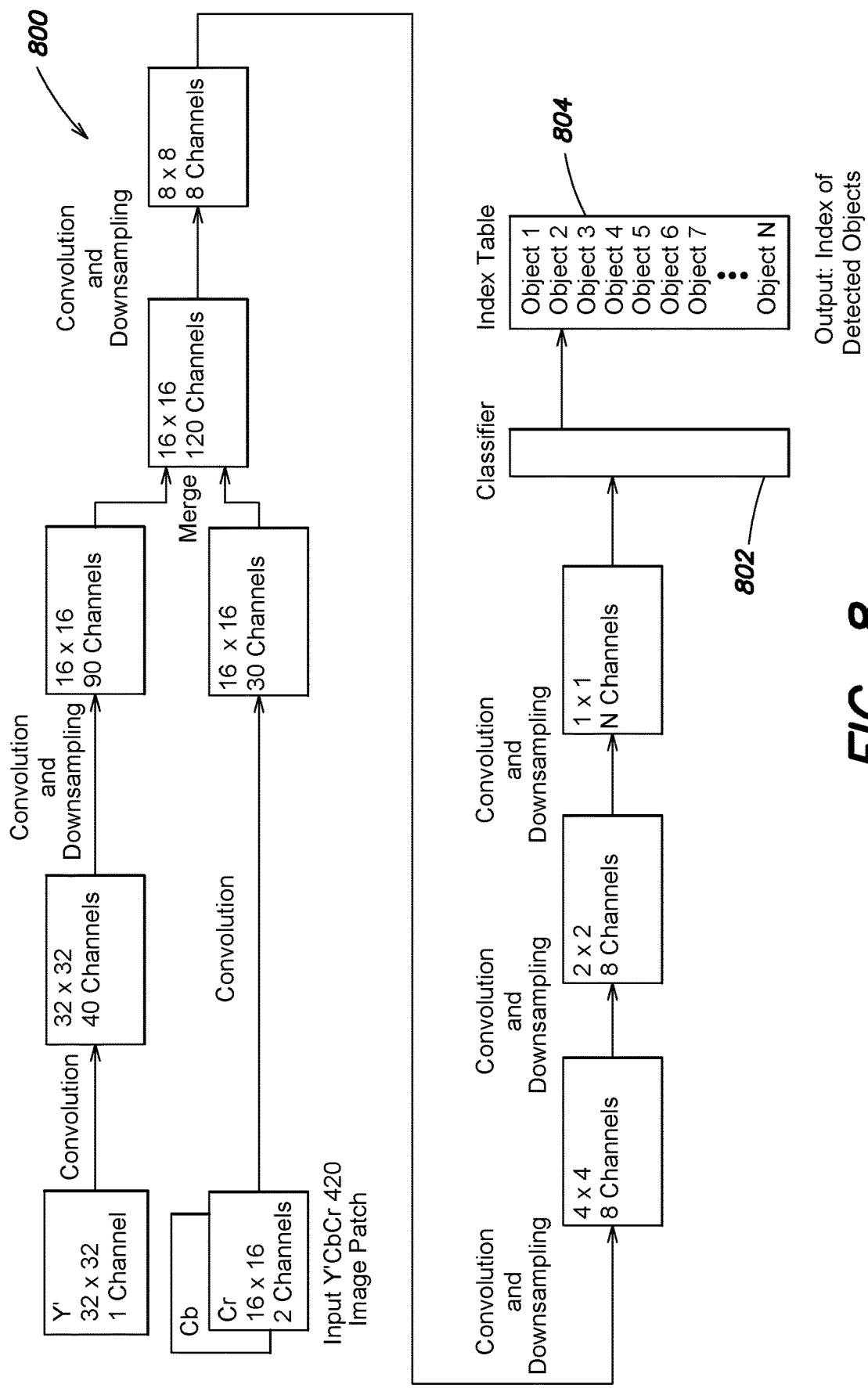
FIG. 8 is a CNN model for detecting objects depicted within Y'CbCr video.

FIG. 8 shows CNN 800 deployed to recognize objects in chroma sub-sampled video. The input data is convolved and downsampled, as discussed above for the autoencoder CNN (FIG. 5), which reduces the dimensionality of the input Y'CbCr video. The result is further convolved and downsampled, eventually reaching the output layer consisting of N 1×1 channels, which is a list of probabilities that an identifier denotes an object depicted in the image. The CNN output is input to classifier 802 that identifies the object in a list of objects in index table 804 having the highest probability of matching the input image. As indicated in the figure, the CNN for efficient object recognition in chroma-subsampled video images applies separate convolutions on the luma and chroma channels before merging and convolving down to the classification layer. The system is trained with a dataset of Y'CbCr images, each image being associated with an identifier of an object known to be depicted in the image. In the training process, this output is compared with the known probabilities, which corresponds to index table 804 in which each entry is set to zero except for the expected object, for which the probability is set to 1.0. The CNN output is compared with the expected output, and the differences are fed back into the model to adjust the CNN parameters and improve the results.

Figure 9A:
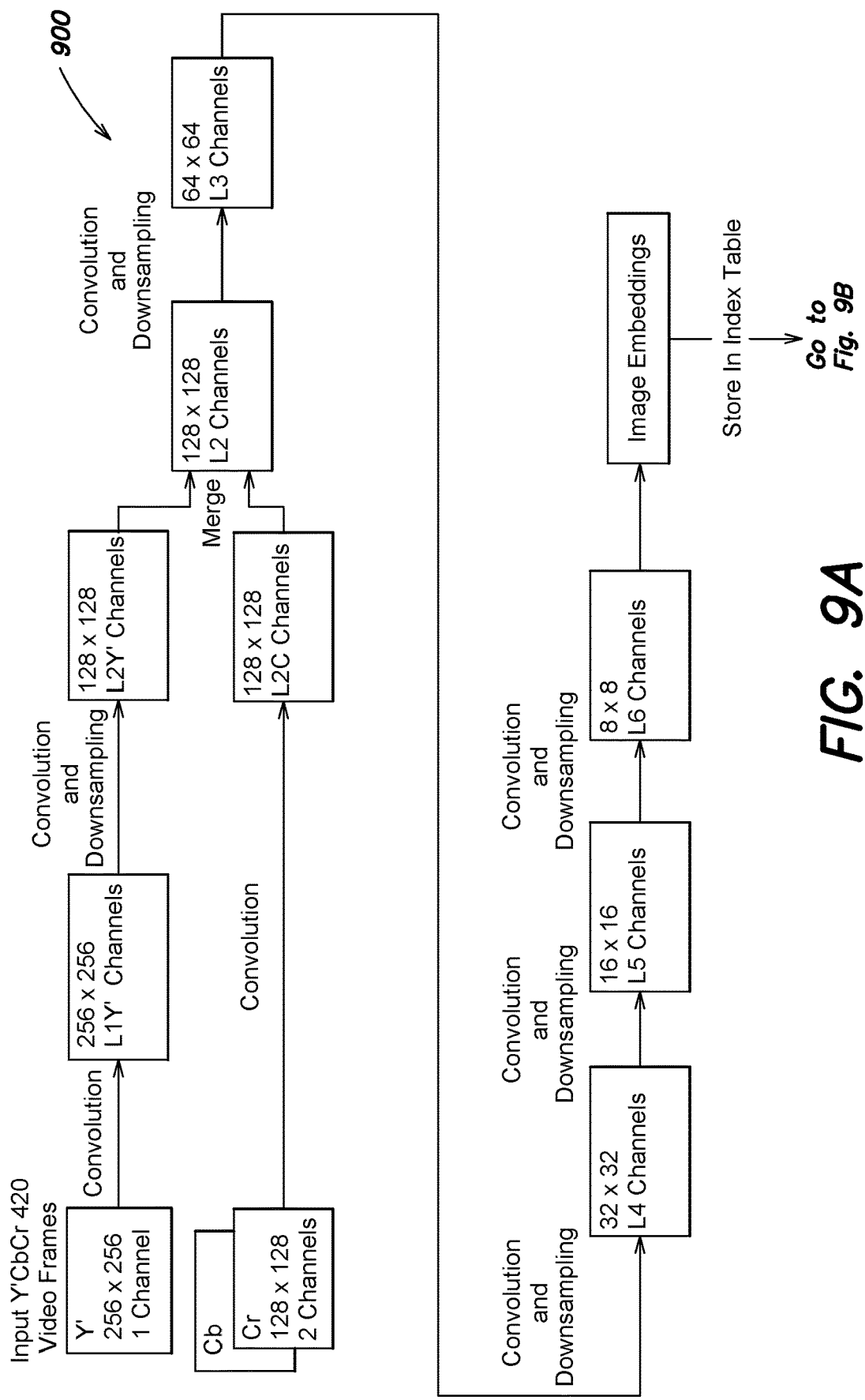
FIG. 9 is a CNN model for performing semantic search on Y'CbCr video.
Figure 9B:
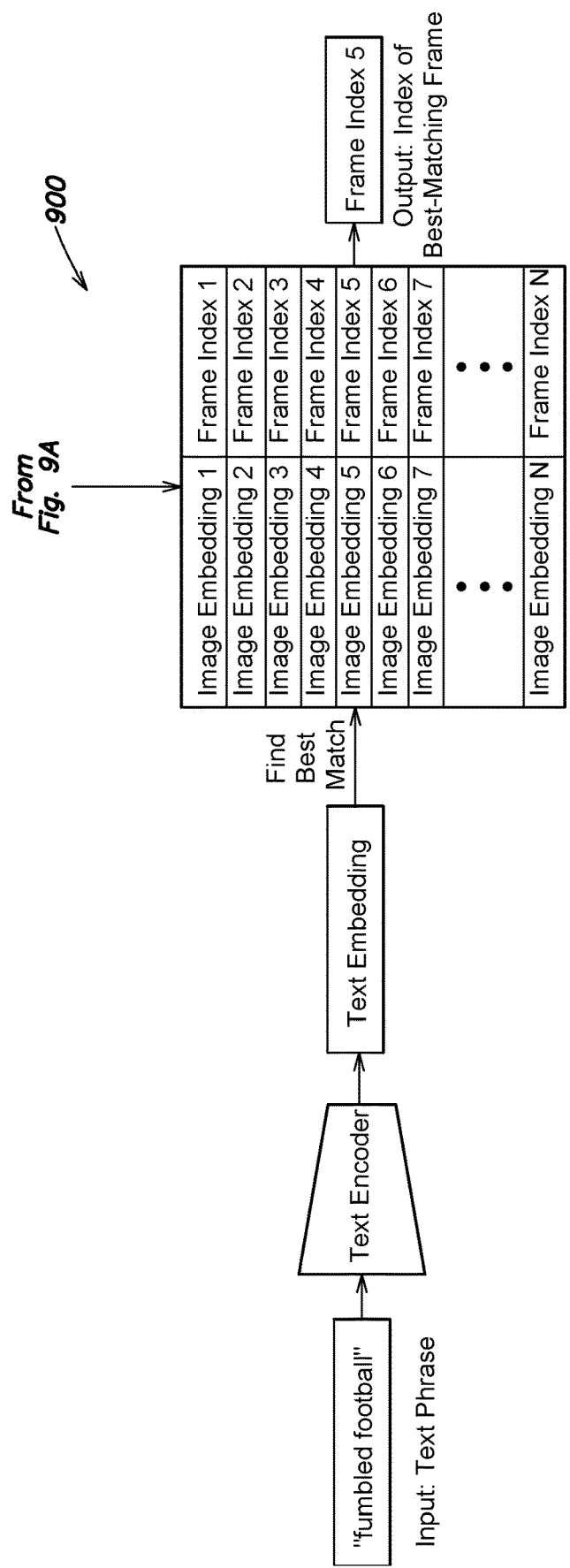

FIG. 9 shows CNN 900 deployed to perform semantic search on chroma-subsampled video, in which a user inputs a text phrase and the CNN outputs an index to a frame of the input video that depicts an object denoted by the text phrase. As shown in the figure, chroma-subsampled video is provided as input, and, following separate convolution and downsampling of the luma and chroma components, the CNN performs further convolutions and downsampling to output an image embedding for each input frame to be used for searching. These embeddings represent a property akin to the gist of an image using an internal machine format. The user enters a text string, which is converted by a text encoding CNN into a text embedding, which is akin to the is the gist of the text in a similar format to that of the image embedding such that the text embedding may be compared to the image embedding. The text embedding obtained from the input text phrase is matched against a list of the image embeddings generated by the CNN for each frame of the input Y'CbCr video to find the best matching embedding, and, via an index table, its corresponding input video frame. Commonly used matching methods are Euclidean distance and cosine similarity. Both the image-encoding CNN and the text-encoding CNN are trained on a training dataset of Y'CbCr video frames, each of which is associated with a caption that refers to an element or object that is known to be depicted in the frame. For a given image/caption pair, the image encoder creates an image embedding, the text encoder creates a text embedding, the two embeddings are compared, and the differences are fed back into both models to improve the results. The goal is to make the embeddings identical. This determines the optimal parameters for both the image-encoding CNN and the text-encoding CNN based on the training data set. Before running inferences, the end user "indexes" their video by running it through the video encoder and saving the results into a table. The user is then able to use the trained CNN to find the best-matching frames when running queries. The number of channels used in the CNN is defined by various hyperparameters. Thus, the initial convolution of the input luma channel generates L1 channels, and the initial convolution of the input chroma channels generates L2 channels. The further convolution and downsampling stages successively generate L3, L4, L5, and L6 channels respectively. Optimal values of the hyperparameters are determined during iterations of the training process.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of generating encoded chroma-subsampled video, the method comprising:
   receiving the chroma-subsampled video; and
   using an encoding convolutional neural network (CNN) to:
   convolve and downsample a luma channel of the chroma-subsampled video;
   perform at least one of a convolution and downsampling of chroma channels of the chroma-subsampled video;
   merge the convolved and downsampled luma and chroma channels; and
   generate the encoded chroma-subsampled video by convolving and downsampling the merged luma and chroma channels.

2. The method of claim 1, wherein the encoding of the chroma-subsampled video generates a compressed version of the chroma-subsampled video.

3. The method of claim 1, wherein the encoding convolutional neural network was trained using a training dataset comprising original chroma-subsampled video as input and comparing the original chroma-subsampled video as expected output with chroma-subsampled video generated by using the encoding CNN to encode the original chroma-subsampled video and a corresponding decoding CNN to decode the encoded chroma-subsampled video.

4. The method of claim 3, wherein the training includes determining matrix values of kernels used by the encoding and decoding CNNs.

5. The method of claim 1, further comprising using a decoding CNN to generate video represented in RGB 444 color space from the encoded chroma-subsampled video.

6. The method of claim 5, wherein the encoding CNN and the decoding CNN were trained using an input data set comprising chroma-subsampled video generated by subsampling original video represented in RGB 444 color space and comparing the original video represented in RGB 444 color space with video represented in RGB 444 color space generated by encoding the original video represented in RGB 444 color space using the encoding CNN and decoding the encoded original video represented in RGB 444 color space using the decoding CNN.

7. The method of claim 1, wherein the received chroma-sub sampled video is noisy, and further comprising using a decoding CNN to generate denoised chroma-subsampled video from the received noisy video.

8. The method of claim 7, wherein the encoding CNN and the decoding CNN were trained using an input data set comprising noisy chroma-subsampled video generated by adding noise to an original chroma-subsampled video and comparing the original chroma-subsampled video with denoised chroma-subsampled video generated by sequentially encoding the noisy chroma-subsampled video using the encoding CNN and decoding the encoded chroma-subsampled video using the decoding CNN.

9. The method of claim 1, wherein the encoding CNN further includes steps that convolve and downsample the encoded chroma-subsampled video to generate an identifier of an object depicted in the received chroma-subsampled video.

10. The method of claim 9, wherein the encoding CNN is trained using a training dataset comprising:
    chroma-subsampled video; and
    associated with each frame of the chroma-subsampled video a known identifier of an object depicted in the frame; and
    wherein for each frame of the training data set provided as input to the encoding CNN, an output of the encoding CNN is compared with its associated object identifier, and a difference between the identifier output by the CNN and the known identifier is fed back into the encoding CNN.

11. The method of claim 1, wherein the encoding CNN further includes steps that convolve and downsample the encoded chroma-subsampled video to generate an image embedding for each frame of the received chroma-subsampled video, wherein the embedding of a given frame corresponds to a caption for an object depicted in the given frame.

12. The method of claim 11, wherein the encoding CNN is trained using a training dataset comprising:
    chroma-subsampled video; and
    associated with each frame of the chroma-subsampled video a caption for an object depicted in the frame; and
    wherein for each frame of the training data set provided as input to the encoding CNN:
    an image embedding is generated from the frame by the encoding CNN; and a text embedding is generated from a caption associated with the frame by a text-encoding CNN; and
a difference between the image embedding and the text embedding is fed back into the encoding CNN and the text CNN.

13. A method of decoding encoded chroma-subsampled video, the method comprising:
receiving the encoded chroma-subsampled video; and
using a decoding convolutional neural network (CNN) to:
split convolved and downsampled merged luma and chroma channels of the encoded chroma-sub sampled video into a first set of channels and a second set of channels;
deconvolve and upsample the first set of channels;
process the second set of channels by performing at least one of a deconvolution and upsampling;
output the deconvolved and upsampled first set of channels as a luma channel of decoded chroma-sub sampled video; and
output the processed second set of channels as chroma channels of the decoded chroma-subsampled video.

14. The method of claim 13, wherein the encoded chroma-subsampled video comprises chroma-subsampled video that has been compressed by an encoding CNN.

15. The method of claim 13, wherein the encoding and decoding CNNs were trained using a training dataset comprising original chroma-subsampled video as input and comparing the original chroma-subsampled video as expected output with chroma-subsampled video generated by sequentially using the encoding CNN to encode the original chroma-subsampled video and the decoding CNN to decode the encoded chroma-subsampled video.

16. The method of claim 15, wherein the training includes determining matrix values of kernels used by the encoding and decoding CNNs.

17. A computer program product comprising:
a non-transitory computer-readable medium with computer-readable instructions encoded thereon, wherein the computer-readable instructions, when processed by a processing device instruct the processing device to perform a method of generating encoded chroma-sub sampled video, the method comprising:
receiving the chroma-subsampled video; and
using an encoding convolutional neural network (CNN) to:
convolve and downsample a luma channel of the chroma-subsampled video;
perform at least one of a convolution and downsampling of chroma channels of the chroma-sub sampled video;
merge the convolved and downsampled luma and chroma channels; and
generate the encoded chroma-sub sampled video by convolving and downsampling the merged luma and chroma channels.

18. A computer program product comprising:
a non-transitory computer-readable medium with computer-readable instructions encoded thereon, wherein the computer-readable instructions, when processed by a processing device instruct the processing device to perform a method of decoding encoded chroma-sub sampled video, the method comprising:
receiving the encoded chroma-subsampled video; and
using a decoding convolutional neural network (CNN) to:
split convolved and downsampled merged luma and chroma channels of the encoded chroma-subsampled video into a first set of channels and a second set of channels;
deconvolve and upsample the first set of channels;
process the second set of channels by performing at least one of a deconvolution and upsampling;
output the deconvolved and upsampled first set of channels as a luma channel of decoded chroma-sub sampled video; and
output the processed second set of channels as chroma channels of the decoded chroma-sub sampled video.

19. A system comprising:
a memory for storing computer-readable instructions; and
a processor connected to the memory, wherein the processor, when executing the computer-readable instructions, causes the system to perform a method of generating encoded chroma-subsampled video, the method comprising:
receiving the chroma-subsampled video; and
using an encoding convolutional neural network (CNN) to:
convolve and downsample a luma channel of the chroma-subsampled video;
perform at least one of a convolution and downsampling of chroma channels of the chroma-sub sampled video;
merge the convolved and downsampled luma and chroma channels; and
generate the encoded chroma-sub sampled video by convolving and downsampling the merged luma and chroma channels.

20. A system comprising:
a memory for storing computer-readable instructions; and
a processor connected to the memory, wherein the processor, when executing the computer-readable instructions, causes the system to perform a method of decoding encoded chroma-subsampled video, the method comprising:
receiving the encoded chroma-subsampled video; and
using a decoding convolutional neural network (CNN) to:
split convolved and downsampled merged luma and chroma channels of the encoded chroma-subsampled video into a first set of channels and a second set of channels;
deconvolve and upsample the first set of channels;
process the second set of channels by performing at least one of a deconvolution and upsampling;
output the deconvolved and upsampled first set of channels as a luma channel of decoded chroma-sub sampled video; and
output the processed second set of channels as chroma channels of the decoded chroma-sub sampled video.

* * * * *